United States Patent [19]
Haferl

[11] 3,823,264
[45] July 9, 1974

[54] CASCODE VIDEO OUTPUT FEEDBACK AMPLIFIER

[75] Inventor: Peter Eduard Haferl, Adliswil, Switzerland

[73] Assignee: RCA Corporation, New York, N.Y.

[22] Filed: Feb. 16, 1972

[21] Appl. No.: 226,800

[30] Foreign Application Priority Data

Apr., 1971 Great Britain .................... 11561/71

[52] U.S. Cl. ............................................ 178/7.5 R
[51] Int. Cl. ............................................ H04n 5/48
[58] Field of Search ............ 330/18, 25, 26, 27, 28, 330/70–73, 76; 178/7.3 R, 7.5 R, 7.3 DC, 7.5 DC, 5.4 R, 5.4 MA

[56] References Cited

UNITED STATES PATENTS

| | | | |
|---|---|---|---|
| 3,070,656 | 12/1962 | Wiencek | 178/7.5 R |
| 3,176,235 | 3/1965 | Bran | 330/28 |
| 3,384,830 | 5/1968 | De Niet | 330/18 |
| 3,466,390 | 9/1969 | Inamiya et al. | 178/7.5 R |
| 3,499,104 | 3/1970 | Austin | 178/7.3 R |
| 3,502,798 | 3/1970 | Bates | 178/5.4 R |
| 3,582,800 | 6/1971 | Lehmann | 330/18 |
| 3,585,295 | 6/1971 | Haferl | 178/7.3 DC |
| 3,598,912 | 8/1971 | Nillesen | 178/7.5 DC |

OTHER PUBLICATIONS

Young-Coupling Dekatron Selectors with Low-cost Transistors Electronic Engineering, May 1967, pp. 323–325.

*Primary Examiner*—Robert L. Griffin
*Assistant Examiner*—George G. Stellar
*Attorney, Agent, or Firm*—Eugene M. Whitacre; Charles I. Brodsky

[57] ABSTRACT

A video output amplifier utilizes two transistors arranged in cascode configuration for driving the cathode electrode of a color television kinescope. A negative feedback network couples the collector electrode of the output transistor of the cascode configuration to the base electrode of the input transistor of the pair, and includes an arc current limiting resistor which serially couples the output transistor to the kinescope cathode.

8 Claims, 1 Drawing Figure

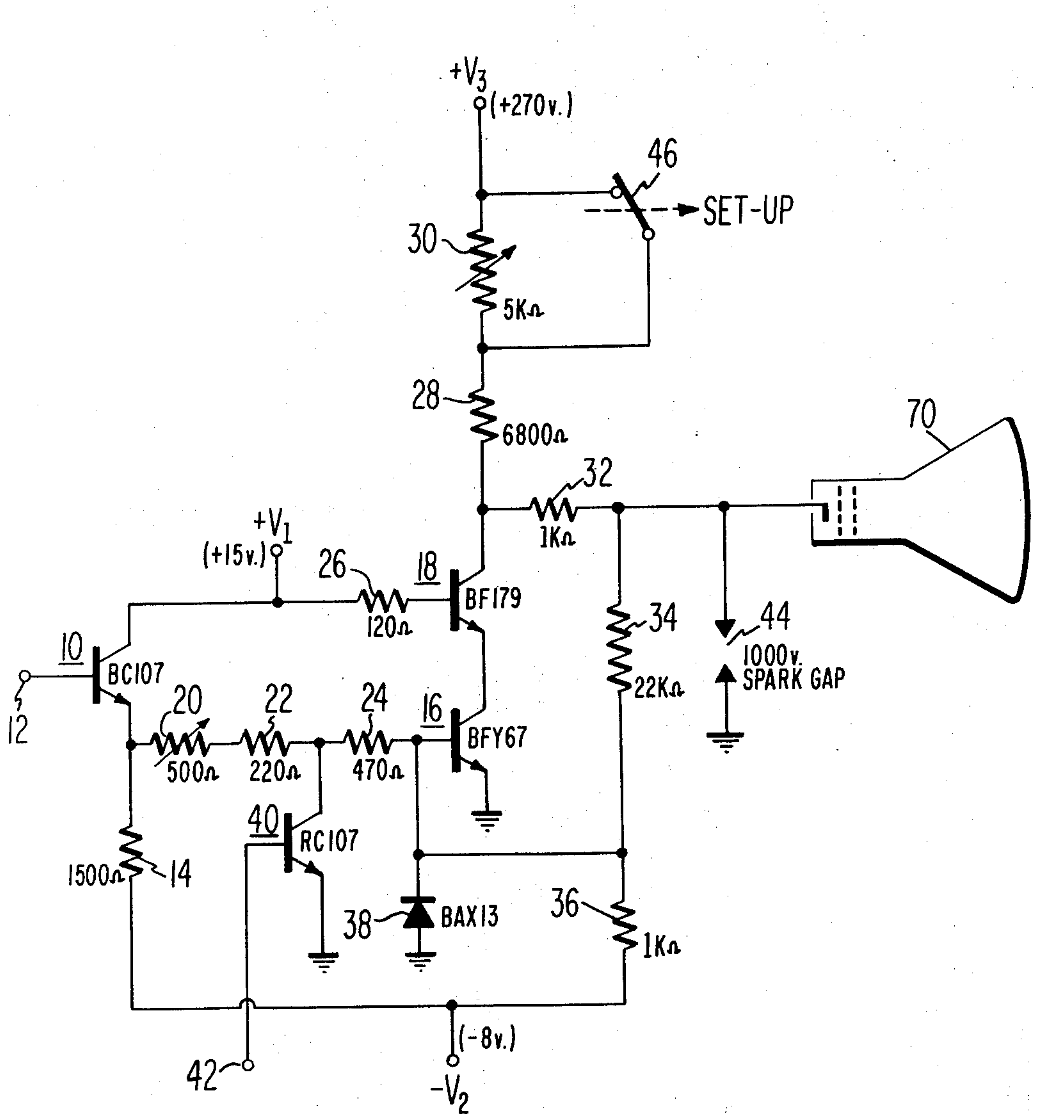
+V3
(+270v.)
46
SET-UP
30
5KΩ
28
6800Ω
32
1KΩ
70
+V1
(+15v.)
26
18
BF179
120Ω
34
22KΩ
44
1000v.
SPARK GAP
10
BC107
12
20
22
24
16
BFY67
500Ω
220Ω
470Ω
40
RC107
1500Ω
14
38
BAX13
36
1KΩ
(-8v.)
42
-V2

CASCODE VIDEO OUTPUT FEEDBACK AMPLIFIER

BACKGROUND OF THE INVENTION

1. Field of the Invention

This invention relates to video output amplifiers, in general, and to such circuits for driving the cathode electrodes of large-screen color television kinescopes, in particular.

2. Description of the Prior Art

Video output amplifiers of the type described are oftentimes used as the red-green-blue amplifiers which drive the cathode electrodes of a large-screen, 110° thin-neck color television tube. Previously employed amplifiers have generally been unable to develop sufficient output voltages for such drive (e.g. 160 volts peak-to-peak) with low-cost video transistors. To achieve desired output voltages at a video bandwidth of 4 MHz while keeping transistor dissipation to less than 2 watts, such designs have, at least in European television receivers, also required the use of complex peaking circuits. These arrangements, however, are not only complex in their design, but have exhibited undesirable tendencies to mistrack at the higher video frequencies due to peaking tolerances and to the associated stray capacitances involved.

Furthermore, these previously employed video amplifiers have commonly used a passive type of high voltage arc protection circuit in which proper operation usually depended on the dressing and positioning of the leads employed. Consistent arc protection could not always be guaranteed with this arrangement, as a result, because the degree of protection afforded varied with the manner in which an arc current limiting resistor was coupled between the kinescope cathode electrode and the transistor output stage.

SUMMARY OF THE INVENTION

As will become clear hereinafter, the video output amplifier of the present invention includes a pair of transistors in cascode circuit configuration. A negative feedback network couples the collector electrode of the output transistor of the cascode stage to the base electrode of the input transistor, and includes, in one path, the arc current limiting resistor. Such resistor cooperates with the capacitance existent between the collector electrode of the output cascode transistor and ground to form a low-pass filter for any voltage arcs which may be developed at the cathode electrode of the color kinescope. This filter serves to delay the application of these voltage arcs to the output transistor via such path until after a second path in the feedback network has applied the effects of this arcing to the input transistor of the cascode pair. The polarities of the transistors employed are selected such that both transistors will become saturated by this second path coupling before the low-pass filter applies the voltage arcs to the collector electrode of the output transistor. This serves to protect that output transistor by effectively short-circuiting the voltage arcs to ground.

Besides offering this protection against picture tube arcing, the video amplifier of the invention also permits a reduced power dissipation in the output transistor through the use of a higher valued load resistor than is commonly employed. Such advantage follows because of the effect of the feedback network in lowering the output impedance of the amplifier, in addition to which the feedback network permits higher voltages to be developed because its stabilizing effect on line voltage variations obviates the need to provide compensating circuitry which operates at the expense of developable output voltages. Because such feedback arrangement serves to enhance the video output voltage which can be developed while maintaining transistor dissipation within tolerable limits, the previously employed peaking circuit can be eliminated, along with its attendant tolerance and picture noise problems at high video frequencies.

BRIEF DESCRIPTION OF THE DRAWING

These and other advantages of the present invention will be more clearly understood from a consideration of the following description taken in connection with the accompanying drawing showing, in schematic form, a video output amplifier constructed in accordance with the invention, and particularly useful in providing red-green-or blue signal drive to the cathode electrode of a color television picture tube.

DETAILED DESCRIPTION OF THE DRAWING

The circuit of the drawing will be seen to include four transistors, a semiconductor rectifier, and a plurality of resistors. A first transistor 10 is arranged in an emitter follower configuration, with its base electrode coupled to receive applied red, grean, or blue video signals from an input terminal 12, with its collector electrode coupled to a source of positive operating potential $+V_1$, and with its emitter electrode coupled to a source of negative operating potential $-V_2$ via a first resistor 14.

A second transistor 16 and a third transistor 18, on the other hand, are connected in cascode configuration to receive and amplify the output signal developed by the emitter follower transistor 10. To this end, the emitter electrode of transistor 18 is connected directly to the collector electrode of transistor 16, whereas the corresponding emitter electrode of that latter transistor is connected to a point of reference or ground potential while its base electrode is coupled to receive the signal from transistor 10. In particular, such signal is coupled from the emitter electrode of transistor 10 to the base electrode of transistor 16 by means of a variable signal drive resistor 20, in series connection with second and third fixed resistors 22, 24. A further resistor 26 couples the base electrode of transistor 18 to the positive potential source $+V_1$ while an additional resistor 28 couples the collector electrode of transistor 18 to a second source of positive operating potential $+V_3$ by means of another variable resistor 30.

A negative feedback network is also illustrated, and includes resistors 32, 34, and 36 coupled in series in the order named between the collector electrode of transistor 18 and the $-V_2$ potential source, with the junction between resistors 34 and 36 being directly connected to the base electrode of transistor 16. Also coupling to the base electrode of transistor 16, at one end of resistor 24, is the cathode electrode of a semiconductor rectifier 38, the anode electrode of which is coupled to the ground potential point — whereas to the other end of resistor 24 is coupled the collector electrode of the fourth transistor 40, the emitter electrode of which is grounded and the base electrode of which is coupled to an input terminal 42. As will be noted, the cathode electrode of the color kinescope 70 is directly connected to the junction of resistors 32, 34, with a spark gap 44 serving to couple the picture tube cathode to ground. Transistors 10, 16, 18 and 40 are shown to be of N-P-N conductivity type, and resistor 30 is made variable to cooperate with a switch 46 in setting up the cut-off point of the color kinescope by varying its screen grid biasing. As indicated, switch 46 normally short-circuits resistor 30, except when such set-up adjustments are to be made.

In operation, positive-going video signals are coupled from input terminal 12 to the base electrode of the emitter follower transistor 10, and are coupled thereby via resistors 20, 22, and 24 to the input transistor 16 of the cascode pair. Transistor 16 is thus rendered conductive, and provides negative-going signals at the emitter electrode of transistor 18 for amplification thereby prior to coupling as such negative extending signals from the collector electrode of transistor 18 to the cathode electrode of the picture tube kinescope. Positive-going pulse signals are supplied at input terminal 42 to drive transistor 40 into saturation during the horizontal and vertical retrace periods of the television signal, to short circuit to ground the video signal coupling to transistor 16 at that time and thereby blank the reproduced kinescope display.

The resistance values chosen for resistors 28, 32, 34 and 36 are selected in conjunction with the voltage of the positive potential source $+V_3$ so that in the absence of signal, transistors 16 and 18 are held just beyond cut-off. For the values illustrated in the drawing, a current of approximately 8.5 milliamperes flows through this resistive chain to set a maximum voltage at the collector electrode of transistor 18 of approximately 220 volts, measured with respect to ground. During blanking, on the other hand, this maximum voltage is increased by approximately 15 volts due to a 1.5 milliampere current flow from the base electrode of transistor 16 through resistor 24 and transistor 40 to ground. With the component values indicated in the drawing, a peak-to-peak signal swing of approximately 180 volts is developed at the collector electrode of transistor 18 when input signals are applied at terminal 12. Resistor 26, in this respect, limits the base current flow of transistor 18 and the collector current flow of transistor 16 when both transistors are driven into saturation. Rectifier 38 will be seen to protect the base-emitter diode of transistor 16 by clamping the negative peaks of applied signals to ground.

As will be readily apparent, spark gap 44 serves to protect the picture tube kinescope against arcing at its cathode electrode. By including resistor 32 in the feedback loop from transistor 18 to transistor 16, furthermore, protection against such arcing will also be afforded these transistors. In particular, when viewed from the picture tube cathode, two feedback paths for the voltage arcs are presented. One path essentially comprises a low-pass filter formed by resistor 32 and the capacitance existent between the collector electrode of transistor 18 and ground — which capacitance consists of the sum of the output capacity of transistor 18, any wiring capacity that may be present, and any heat sink capacity that might exist. The second feedback path for the voltage arcs, on the other hand, comprises the resistor 34 connection to the base electrode of transistor 16.

If any positive going voltage arcs then occur, the low-pass filter will delay their application to the collector electrode of transistor 18 until after their application to the base electrode of transistor 16. Thus, the positive-going arc will first drive transistor 16 into saturation — thereby decreasing its collector electrode potential to cause the potential source $+V_1$ to saturate transistor 18, with the timing being such as to cause this saturation also prior to the application to transistor 18 of the positive-going arc. Any tendency for the arc to thereby damage transistor 18 will be offset, as the arc will then be short-circuited to ground through the then saturated transistors 16, 18. Protection against negative going voltage arcs is similarly afforded by the limiting action provided by the semiconductor rectifier 38, which also charges up the base electrode of transistor 16 in response to place it and transistor 18 into saturation prior to the application of the negative pulse to the collector electrode of that latter transistor.

It will thus be seen that this system of arc protection follows because the voltage produced by the arc arrives first at the base electrode of transistor 16. Due to the delaying action of the low-pass filter including resistor 32, the arc voltage is applied to the collector electrode of transistor 18 only when that transistor is already in saturation due to the controlled action of transistor 16. If the arc current limiting resistor 32 were connected external to the feedback network for the cascode configuration, i.e. according to prior designs — as where resistor 34 would connect directly to the collector electrode of transistor 18 and where resistor 32 would couple their common junction to the picture tube cathode — no appreciable difference in delay will be presented to voltage arcs being applied by the two feedback paths to the collector electrode of transistor 18 and to the base electrode of transistor 16. Transistor 18 could then very well be damaged by any picture tube arcing which occurs when that transistor is in its non-conductive state.

Other advantages of the invention include the widely linearized frequency response afforded by the negative feedback, to the extent that only a slight frequency correction need be made in the luminance channel of the color set — approximately 6dB at a 4 MHz frequency in order to produce adequate aperture correction of the video signal. Another advantage follows the use of a higher valued load resistor 28 for the cascode configuration than is normally employed. Such use of a larger resistor is permissible because the feedback network reduces the effective amplifier output impedance. It will be noted that the feedback arrangement also permits a higher value of maximum video output voltage to be developed because its stabilizing effect eliminates the need to consider the effects of possible line voltage variation on developable output voltage excursions.

A further advantage of the instant circuit is that any hum appearing at the $+V_3$ operating potential source will generally remain in the blacker-than-black region of the television display. Where the $+V_3$ supply is of 270 volts magnitude as indicated, such voltage can be obtained by rectification of an available 220 volt alternating current power line (as in European television design), obtaining a ripple voltage of approximately 10 to 15 volts. Such ripple will not be visible on the television screen for the illustrated circuit, and the direct voltage developed can be used for both the deflection circuitry of the receiver and for the video output amplifier shown. Added regulation of the $+V_3$ supply, furthermore, is not required because such regulation is internally provided by the feedback arrangement.

While there has been described what is considered to be a preferred embodiment of the present invention, it will be readily apparent that other modifications may be made by those skilled in the art without departing from the teachings herein of including the arc current limiting resistor within the feedback loop of the video amplifier output stage of a television receiver, instead of having it external to such loop as in previous circuit configurations.

What is claimed is:

1. A video output stage for a television receiver adapted to drive the cathode electrode of a picture tube kinescope whereat voltage arcs may undesirably be produced, comprising:

first and second transistors having emitter, base and collector electrodes arranged in cascode amplifier configuration, with the emitter electrode of said second transistor being coupled to a point of reference potential and with there being existent an inherent capacitance between the collector electrode of said first transistor and said point of reference potential;

means coupling the collector electrode of said first transistor to said picture tube cathode electrode for applying video signals thereto, said means comprising only passive circuit elements and including a current limiting resistance; and a negative feedback network from the collector electrode of said first transistor to the base electrode of said second transistor;

said current limiting resistance being included in the feedback network between said first and second transistors and cooperating with said inherent capacitance to form a filter circuit to delay the application of said voltage arcs from said picture tube cathode electrode to the collector electrode of said first transistor until after said voltage arcs are applied via the remainder of said feedback network from said picture tube cathode to the base electrode of said second transistor.

2. The video output stage of claim 1 wherein there is included a first source of operating potential, and wherein said feedback network includes first, second and third resistors serially between the collector electrode of said first transistor and said operating potential source, with the junction of said second and third resistors being coupled to the base electrode of said second transistor, and with said first resistor representing said current limiting resistance.

3. The video output stage of claim 2 wherein the cathode electrode of said picture tube is connected to the junction of said first and second resistors and wherein a spark gap means is additionally included, coupled between said picture tube cathode electrode and a point of reference potential.

4. The video output stage of claim 3 wherein a semiconductor rectifier is further included, coupled between the base and emitter electrodes of said second transistor of said cascode configuration, and, being poled in the opposite direction to the base-emitter junction of said second transistor.

5. The video output stage of claim 4 wherein the emitter electrode of said first transistor is connected to the collector electrode of said second transistor, wherein the collector electrode of said first transistor is coupled to a second source of operating potential, wherein the base electrode of said first transistor is coupled to a third source of operating potential, wherein the emitter electrode of said second transistor is connected to said point of reference potential, and wherein the base electrode of said second transistor is coupled to receive applied input signals for amplification.

6. The video output stage of claim 5 wherein a fourth resistor is included to coupled the collector electrode of said first transistor to said second source of operating potential and wherein a fifth resistor is included to coupled the base electrode of said first transistor to said third source of operating potential.

7. The video output stage of claim 6 wherein said first and second transistors are of N-P-N conductivity type and wherein a sixth resistor is included to couple the base electrode of said second transistor to receive positive-going input signals for amplification.

8. The video output stage of claim 7 wherein said first source of operating potential is of negative polarity and wherein said second and third sources of operating potential are of positive polarity.

* * * * *